United States Patent
Athens et al.

(10) Patent No.: US 6,631,012 B2
(45) Date of Patent: Oct. 7, 2003

(54) APPARATUS AND METHOD FOR PRINTING TWO-DIMENSIONAL BARCODE AND ARTICLES INCORPORATING SUCH BARCODE

(75) Inventors: G. Thomas Athens, Derby, CT (US); John A. Hurd, Lake Mary, FL (US); Jerome E. Jackson, Newtown, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 10/013,575

(22) Filed: Dec. 11, 2001

(65) Prior Publication Data

US 2003/0107759 A1 Jun. 12, 2003

(51) Int. Cl.[7] .............................................. G06F 15/00
(52) U.S. Cl. ....................................... 358/1.15; 358/1.1
(58) Field of Search .......................... 358/1.1, 1.6, 1.7, 358/1.13, 1.15, 1.18; 700/227; 235/454, 462.1, 462.08, 462.09, 494; 380/51

(56) References Cited

U.S. PATENT DOCUMENTS

| | | | | |
|---|---|---|---|---|
| 5,050,229 A | | 9/1991 | Barski et al. ................. 382/55 |
| 5,521,368 A | * | 5/1996 | Adachi .................. 235/462.08 |
| 5,698,833 A | * | 12/1997 | Skinger ................. 235/462.09 |
| 5,767,889 A | | 6/1998 | Ackley ....................... 347/171 |
| 5,841,954 A | | 11/1998 | Ackley ........................ 395/108 |
| 5,970,151 A | * | 10/1999 | Windel et al. ................. 380/51 |
| 6,201,901 B1 | | 3/2001 | Zhou et al. .................. 382/306 |
| 6,398,117 B1 | * | 6/2002 | Oakeson et al. ............. 235/494 |
| 6,446,868 B1 | * | 9/2002 | Robertson et al. ....... 235/462.1 |
| 6,460,766 B1 | * | 10/2002 | Olschafskie et al. ........ 235/454 |
| 6,463,354 B1 | * | 10/2002 | Pintsov ...................... 700/227 |
| 6,484,933 B1 | | 11/2002 | Zimmerman et al. ....... 235/375 |

* cited by examiner

Primary Examiner—Gabriel Garcia
(74) Attorney, Agent, or Firm—Charles R. Malandra, Jr.; Angelo N. Chaclas

(57) ABSTRACT

A method and system for printing a 2D-barcode corresponding to a binary data array and a substrate imprinted with such barcode. The barcode has I first columns of modules and J rows of modules transverse to columns. Each module having a one-to-one correspondence with a bit in a data array and comprising X columns and Y rows of pixels. All pixels are unprinted if said corresponding data bits for a module is not asserted; and otherwise: for pixel columns P(1) through P(X−H) and rows P(1) through P(Y−V), where H is in the range 0 to X−1 and V is in the range 0 to Y−1, all pixels are printed; for first columns P(X−H+1) through P(X) and rows P(1) through P(Y−V), all pixels are printed if a corresponding data bit for an adjacent module in the next module column is asserted; and for columns P(X−H+1) through P(X), rows P(Y−V+1) through P(Y) are not printed if a corresponding data bit for an adjacent or diagonally adjacent module in a next first is not asserted. H and V are not both equal to 0.

21 Claims, 5 Drawing Sheets

APPARATUS AND METHOD FOR PRINTING TWO-DIMENSIONAL BARCODE AND ARTICLES INCORPORATING SUCH BARCODE

BACKGROUND OF THE INVENTION

The subject invention relates to an apparatus and method for printing an improved two-dimensional barcode and to articles marked with such barcode. More particularly it relates to such apparatus, method and articles where dimensions of modules comprising such barcode are selectively reduced to compensate for module growth during printing.

The use of printed barcodes to mark articles with information in a manner, which is easily machine-readable, is well known. Almost every article sold by a supermarket or department store is marked with a Product Identification Code, which is scanned at the time of sale to determine the price and for inventory control. For such applications, where the amount of information to be scanned is relatively small, simple, one-dimensional barcodes, which are simple to print and easily scanned, have proven adequate. However as the range of applications using barcodes has grown, the need for barcode formats with greater information density has increased. One such application is the need to print substantial amounts of machine-readable postal information in a limited area on a mail piece. In response to this and other needs, various two-dimensional barcode formats, (hereinafter sometimes "2D-barcode"), such as Data Matrix 2D Barcodes based on the AIM International Technical Specification—International Symbology Specification—marketed by AIM International, Inc; or PDF-417 symbology based on the Uniform Symbology Specification PDF-417 by AIM USA, have been developed.

FIGS. 1A and 1B illustrate such two-dimensional barcode formats. In FIG. 1A, data to be printed as 2D-barcode is arranged as array 10 of data bits DATA(i,j) having I columns and J rows. FIG. 1B shows an array 12 of modules M(i,j) corresponding to a 2D-barcode having I columns and J rows of modules in one-to-one correspondence with data array 10. Each of modules M(i,j) comprises an array of pixel values P(x,y) having X columns and Y rows. Typically, if DATA(i,j) is asserted, i.e. equals 1, then corresponding module M(i,j) is printed, and otherwise is left unprinted. (Printed values for P(x,y) are shown as "*".)

Details of particular 2D-barcode formats are not relevant to the present invention except to note that each printed barcode will comprise an apparently random array of printed and unprinted modules; and that, because of the need to limit the area of the 2D-barcode, each module will typically be only a few print elements (hereinafter sometimes "pixels") in height and width. Thus the tendency of printed modules to "grow" or "bleed" into adjacent unprinted modules can be a source of significant error in scanning of 2D-barcodes.

While it is known to "thin", i.e. reduce in size, printed modules which are adjacent to unprinted modules, it is a computationally extensive and slow process requiring substantial memory space to examine an entire data array and form a bit map image of the 2D-barcode where printed modules are appropriately thinned. This problem is particularly acute in applications such as digital postage meters which print 2D-barcode on mail pieces and which are limited both in processing power and available memory.

Thus, it is an object of the subject invention to provide a method and apparatus for converting a column, or row, (hereinafter sometimes generally "sequence") of a data array into a corresponding column, or row, of modules of a 2D-barcode and appropriately thinning printed modules in the column, or row, "on the fly" without need to examine the entire data array or form a bit map image of the entire 2D barcode. It is another object of the subject invention to provide articles such as mailpieces, which incorporate such barcode.

BRIEF SUMMARY OF THE INVENTION

The above object is achieved and the disadvantages of the prior art are overcome in accordance with the subject invention by a method, and a system for carrying out the method, for generating and outputting a bitstream corresponding to a 2D-barcode having I first sequences of modules and J second sequences of said modules substantially orthogonal to said first sequences, each of said modules having a one-to-one correspondence with a bit in a binary data array and comprising X first sequences of pixels substantially parallel to said first sequences of said modules and Y second sequences of said pixels substantially parallel to said second sequences of said modules. A bit map corresponding to an initial first sequence of said modules and comprising binary pixel values P(x,y) is generated. For each module in said initial first sequence, all P(x,y) equal 0 if said corresponding data bits are not asserted. Otherwise, for first pixel sequences P(1) through P(X−H), where H is in the range 0 to X−1, all P(x,y), equal 1; for first pixel sequences P(X−H+1) through P(X), all P(x,y) in second pixel sequences P(1) through P(Y−V), where V is in the range 0 to Y−1, equal 1 if a corresponding data bit for an adjacent module in a next first sequence equals 1, and otherwise equal 0; and for first pixel sequences P(X−H+1) through P(X), all P(x,y) in second pixel sequences P(Y−V+1) through P(Y) equal 0 if said corresponding data bit for an adjacent module in said next first sequence equals 0, or if said corresponding data bit for a diagonally adjacent module in said next first sequence equals 0. The bit map is output as a bitstream by: for each module in said initial first module sequence setting all P(x,y) in said second pixel sequences P(Y−V+1) through P(Y)=0 if a data bit corresponding to a next module in said initial first sequence=0; for each module in said initial first module sequence outputting an initial first pixel sequence; repeating step b2 for each remaining first pixel sequence; and repeating steps a and b for each remaining first module sequence. H and V are not both equal to 0.

In accordance with one aspect of the subject invention said first module sequences are columns substantially transverse to a print direction.

In accordance with another aspect of the subject invention said columns are printed using an inkjet printhead having a linear array of nozzles for printing a plurality of pixels substantially at one time.

In accordance with another aspect of the subject invention said first module sequences are rows substantially parallel to a print direction.

In accordance with another aspect of the subject invention said columns are printed using a printhead having a mechanism for printing single pixel rows.

Other objects and advantages of the subject invention will be apparent to those skilled in the art from consideration of the detailed description set forth below and the attached drawings.

DETAILED DESCRIPTION OF PREFERRED EMBODIMENTS OF THE INVENTION

Figures 1A, 1B:
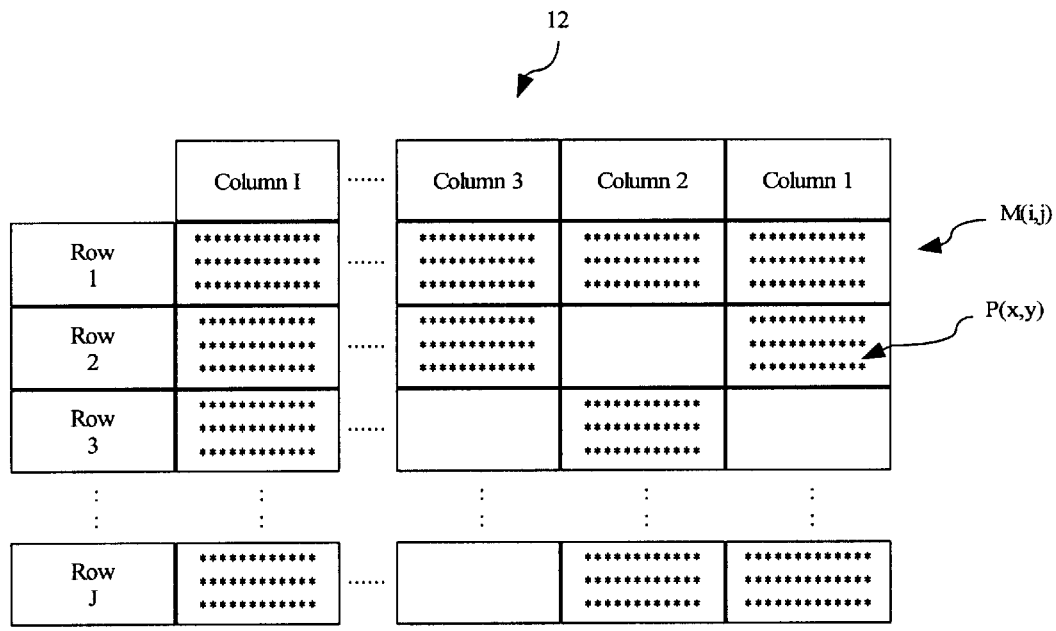
FIGS. 1A and 1B show a known 2D-barcode corresponding to a data array.
Figure 2:
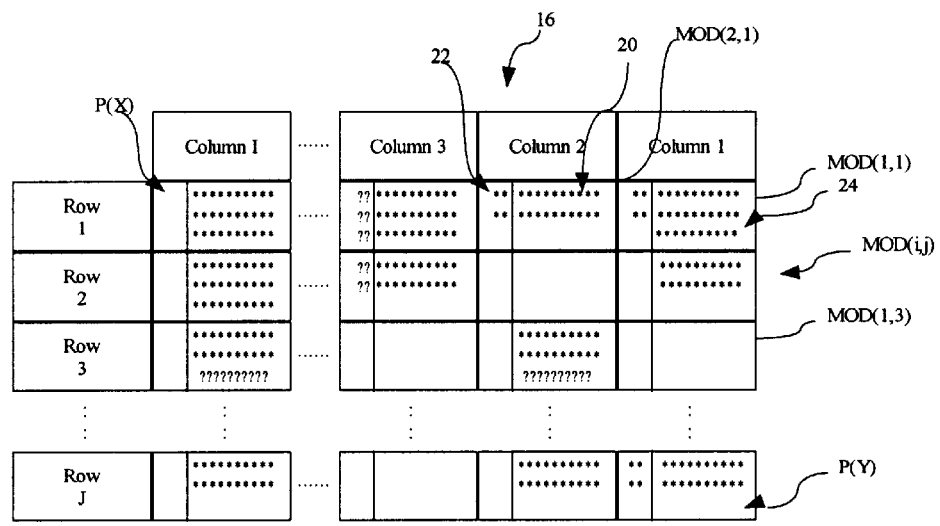
FIG. 2 shows a 2d-barcode thinned in accordance with the present invention.

FIG. 2 shows array 16 formed from modules MOD(i,j) in accordance with the present invention and corresponding to data array 10. Modules MOD(i,j) comprise pixel values P(x,y). All values P(x,y) are set equal to 0 for modules which correspond to an unasserted data bit, e.g. MOD(1,3). An upper rightmost group of values P(x,y) are set equal to 1 for modules which correspond to an asserted data bit, e.g. group 20 in MOD(2,1). Values P(x,y) for a leftmost group, e.g. group 22 in MOD(2,1) and a lowermost group, e.g. group 24 in MOD(1,1), are determined by data values corresponding to adjacent modules, as will be described further below with respect to FIG. 3. It should be noted that corresponding data values for undefined modules are assumed to be 0 so that values P(x,y) in the leftmost pixel columns P(X) in module column I and lowermost pixel rows P(Y) in module row J are always equal to 0. (Values P(x,y) determined by data not shown are shown by "?".)

Figure 3:
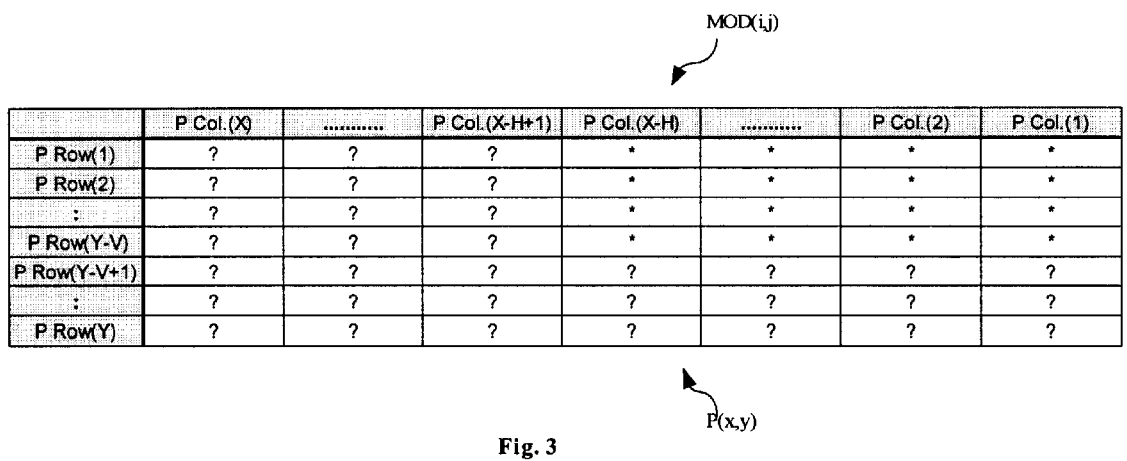
FIG. 3 shows a more detailed representation of a module printed in accordance with the present invention.

FIG. 3 shows one of modules MOD(i,j) which is to be printed, i.e. which corresponds to a "1" in data array 10, and more fully illustrates the determination of values P(x,y). Values P(x,y) which are comprised in both pixel columns P(1) through P(X–H), where H is in the range 0 to X–1; and in pixel rows P(1) through P(Y–V), where V is in the range 0 to Y–1, are set equal to 1. Values P(x,y) which are comprised in both pixel columns P(X–H+1) through P(X), and in pixel rows P(1) through P(Y–V) are set equal to 1 if a corresponding data bit for an adjacent module in a next first sequence MOD(i+1,j) equals 1, and otherwise equal 0. Values P(x,y) which are comprised in both pixel columns P(X–H+1) through P(X), and in pixel rows P(Y–V+1) through P(Y) are set equal to 0 if a corresponding data bit for an adjacent module in a next first sequence MOD(i+1,j) equals 0 or if said corresponding data bit for a diagonally adjacent module in said next first sequence MOD(i+1,j+1) equals 0.

Preferably, X is approximately equal to 6, H is approximately equal to 1, Y is approximately equal 3 and V is approximately equal to 1.

Figure 4:
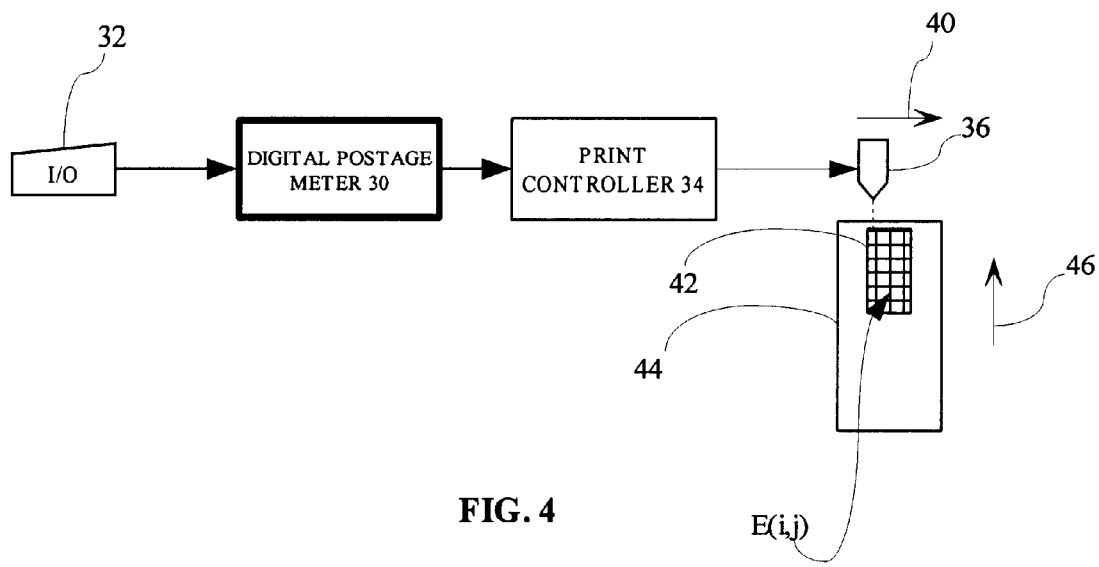
FIG. 4 shows a schematic block diagram of a digital postage meter programmed to print postal indicia including 2D-barcode in accordance with the present invention.

FIG. 4 shows postage metering system 28, which includes digital postage meter 30, I/O device 32, print controller 34, and printhead 36. Meter 30 is a secure, programmable device that receives postal information from I/O device 32; which can be a keyboard, postal scale, data processing system or other I/O device, generates postal indicia representative of the appropriate postage amount, accounts for the postage amount expended, and outputs bitstreams representative of the indicia to print controller 34. Controller 34 receives the bitstream and controls printhead 36 to print print elements (i.e. printed pixels) E(x,y) in accordance with the bitstream as printhead 36 moves in print direction 40 to print indicia including 2D-barcode 42, and possibly human-readable or graphic elements, onto substrate 44, which is typically a mail piece envelope. Preferably, printhead 36 is an inkjet printhead comprising a linear array of nozzles aligned transversely to print direction 40 for printing all, or a substantial portion of a pixel column at one time. In other embodiments printhead 36 can comprise a laser imaging device, or similar mechanism for printing single pixel rows as the laser beam is rapidly scanned across substrate 44. A transport mechanism, not shown, moves substrate 44 in direction 46,transverse to print direction 40 under control of controller 34. In still other embodiments printhead 36 can be fixed and a transport mechanism can be controlled by controller 34 to generate appropriate relative motion between printhead 36 and substrate 44.

Operation of postage metering system 10, as described above, is well known to those skilled in the art and need be described further for an understanding of the present invention.

Figure 5:
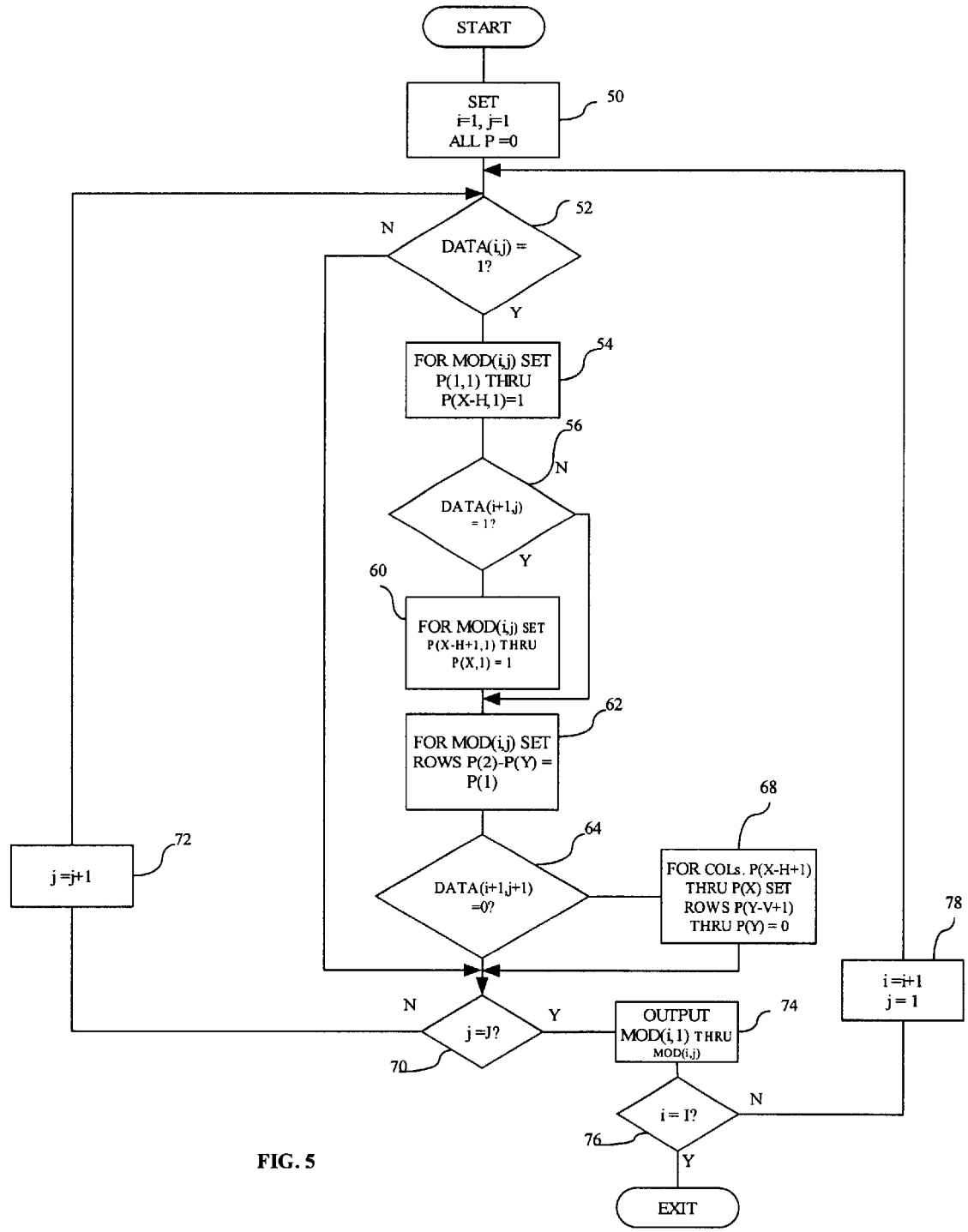
FIG. 5 shows a flow diagram of the generation and output of a column of modules in accordance with the present invention.
Figure 6:
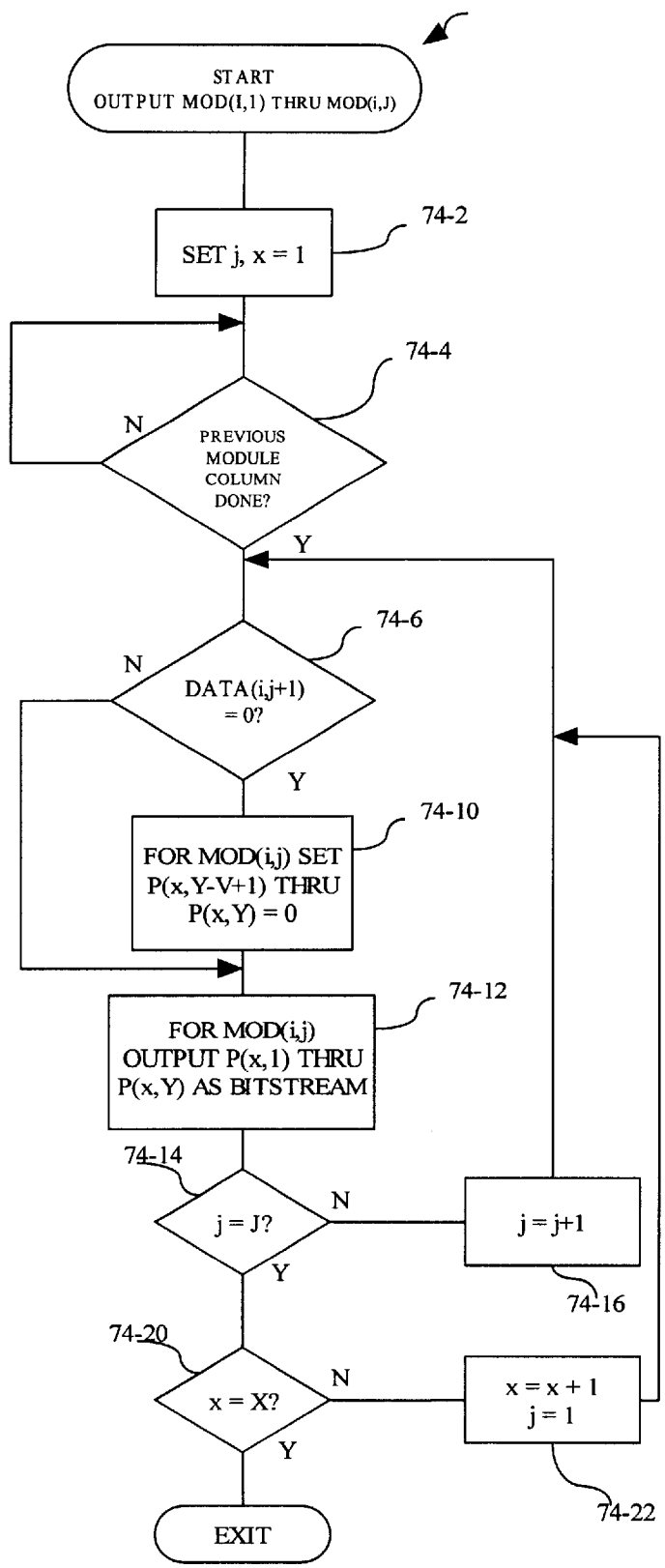
FIG. 6 shows a more detailed flow diagram of the output step of the diagram of FIG. 6.

In accordance with the present invention postage meter 30 generates data array 10 corresponding to 2D-barcode in a known manner and is programmed to output a bitstream representative of a thinned 2D-barcode in a manner shown with respect to FIGS. 5 and 6. For purposes of this description printhead 36 is considered to be an inkjet printhead capable of printing a pixel column spanning indicia 42. In other embodiments indicia 42 can comprise contiguous segments printed on successive passes of print head 36.

In FIG. 5, at step 50, indices i and j are set equal to 1, and all P(x,y) for module column MOD(i) are set equal to 0. At step 52 a determination is made if corresponding data bit DATA(i,j)=1. If so, pixel values P(1,1) through P(1, X–H) in pixel column P(1) of MOD(i,j) are set equal to 1 at step 54.

Then, at step 56, a determination is made if the corresponding data for the adjacent module in the next column DATA(i+1,j) is equal to 1, and if so, values P(X–H+1,1) through P(X) are set equal to 1, and otherwise remain 0. At step 62 pixel rows P(2) through P(Y) are set equal to P(1). Thus the leftmost H pixel columns are thinned if the if adjacent module MOD(i+1,j) is unprinted.

Then, at step 64, a determination is made if the corresponding data for the diagonally adjacent module in the next column DATA(i+1,j+1) is equal to 0, and if so, at step 68, pixel values P(x,y) common to rows P(Y–V+1) through P(Y) and columns P(X–H+1) through P(X) are set equal to zero. Thus an H×V block of pixels in the lower left corner of MOD(i,j) are thinned if diagonally adjacent module MOD(i+1,j+1) is unprinted.

After step 68, or after step 64 if DATA(i+1,j+1) equals 1, or after step 52 if DATA(i,j) equals 0, at step 70 a determination is made if j equals J. If not j is set equal to j+1 at step 72 and, at step 52, processing of next module MOD(i,j+1) begins. If j equals J, the bitmap for module column MOD(i) is complete and is output at step 74. During step 74 lowermost pixel rows P(Y–V+1) through P(Y) are thinned as will be described with respect to FIG. 6 below.

At step 76, a determination is made if i equals I. If not i is set equal to i+1 and j is set equal to 1 at step 78 and, at step 52, processing of module MOD(i+1,j+1) for the next module column begins, and otherwise the complete bitmap has been generated and output module column by module column and the program exits.

FIG. 6 shows a more detailed description of output step 74. At step 74-2 indices j and x are set equal to 1, and at step 74-4 the program waits until the previous module column has been printed. In other embodiments of the present invention controller 34 can include sufficient storage so that the entire bitmap for 2d-barcode 42 can be output continuously and step 74-4 can be eliminated.

At step 74-6 it is determined if data bit DATA(i,j+1), corresponding to the next module in sequence, equals 0 and, if so, values P(x, Y−V+1) through P(Y) are set equal to 0, and otherwise remain unchanged. At 74-12 values P(x,1) through P(Y) for MOD(i,j) are output to controller 34 as a bitstream. Thus the lowermost Y pixel rows of MOD(i,j) are thinned if next module in sequence MOD(i,j+1) is unprinted.

At 74-14 it is determined if j is equal to J, that is if pixel column P(x) for last module MOD(i,J) has been output, and, if not, at 74-16, j is set equal to j+1 and processing of column P(x) for MOD(i,j+1) begins at step 74-6.

If j is equal to J, at 74-20 it is determined if x is equal to X, that is if last pixel column P(X) for last module MOD(i,J) has been output and, if not, at 74-22, x is set equal to x+1 and j is set equal to 1, and processing of column P(x+1) for MOD(i, 1) begins at step 74-6. Otherwise output of the bitmap for module column MOD(i) is complete and the program exits step 74.

In other embodiments of the present invention, step 74 can be called as subroutine and run concurrently with processing of other module columns as described above with respect to FIG. 5. In still other embodiments of the present invention steps 74 can be carried out by controller 34 operating on a bitstream from meter 30. It will be apparent to those skilled in the art that for these embodiments values for DATA(i,j+1) can be determined directly from the unmodified bitstream so that controller 34 need not have access to array 10.

In embodiments of the present invention where printhead 36 comprises a laser imaging mechanism or the like which prints single pixel rows as it scans the roles of the rows and columns can be interchanged so that so that the bitstream output is representative of successive pixel rows parallel to print direction 40. Changes to the program logic described above to achieve this are straightforward and would be readily apparent to person skilled in the art.

The embodiments described above and illustrated in the attached drawings have been given by way of example and illustration only. From the teachings of the present application those skilled in the art will readily recognize numerous other embodiments in accordance with the subject invention. Accordingly, limitations on the subject invention are to be found only in the claims set forth below.

What is claimed is:

1. A method for generating and outputting a bitstream corresponding to a 2D-barcode having I first sequences of modules and J second sequences of said modules substantially orthogonal to said first sequences, each of said modules having a one-to-one correspondence with a bit in a binary data array and comprising X first sequences of pixels substantially parallel to said first sequences of said modules and Y second sequences of said pixels substantially parallel to said second sequences of said modules, said method comprising the steps of:
   a) generating a bit map corresponding to an initial first sequence of said modules and comprising binary pixel values P(x,y), where for each module in said initial first sequence;
      a1) all P(x,y) equal 0 if said corresponding data bits are not asserted; and otherwise
      a2) for first pixel sequences P(1) through P(X−H), where H is in the range 0 to X−1, all P(x,y), equal 1;
      a3) for first pixel sequences P(X−H+1) through P(X), all P(x,y) in second pixel sequences P(1) through P(Y−V), where V is in the range 0 to Y−1, equal 1 if a corresponding data bit for an adjacent module in a next first sequence equals 1, and otherwise equal 0; and
      a4) for first pixel sequences P(X−H+1) through P(X), all P(x,y) in second pixel sequences P(Y−V+1) through P(Y) equal 0 if said corresponding data bit for an adjacent module in said next first sequence equals 0, or if said corresponding data bit for a diagonally adjacent module in said next first sequence equals 0; and
   b) outputting said bit map as a bitstream by:
      b1) for each module in said initial first module sequence setting all P(x,y) in said second pixel sequences P(Y−V+1) through P(Y)=0 if a data bit corresponding to a next module in said initial first sequence=0;
      b2) for each module in said initial first module sequence outputting an initial first pixel sequence;
      b3) repeating step b2 for each remaining first pixel sequence; and
   c) repeating steps a and b for each remaining first module sequence; where
   d) H and V are not both equal to 0.

2. A method as described in claim 1 where said first module sequences are columns substantially transverse to a print direction.

3. A method as described in claim 2 where said bitstream is printed as successive columns of pixels substantially transverse to said print direction.

4. A method as described in claim 3 where said columns are printed using an inkjet printhead having a linear array of nozzles for printing a plurality of pixels substantially at one time.

5. A method as described in claim 2 where said modules comprise approximately 6 columns and 3 rows of pixels and H is equal to approximately 1 and V is equal to approximately 1.

6. A method as described in claim 1 where said first module sequences are rows substantially parallel to a print direction.

7. A method as described in claim 6 where said bitstream is printed as successive rows of pixels substantially parallel to said print direction.

8. A method as described in claim 7 where said columns are printed using a printhead having a mechanism for printing single pixel rows.

9. A method as described in claim 6 where said modules comprise approximately 6 columns and 3 rows of pixels and H is equal to approximately 1 and V is equal to approximately 1.

10. A system for printing a 2D-barcode corresponding to a binary data array having I first sequences of modules and J second sequences of said modules substantially orthogonal to said first sequences, each of said modules having a one-to-one correspondence with a bit in said binary data array and comprising X first sequences of pixels substantially parallel to said first sequences of modules and Y second sequences of said pixels substantially parallel to said second sequences of said modules, comprising:
   a) a programmable device programmed to generate a bit map corresponding to an initial first sequence of said modules and comprising binary pixel values P(x,y), where for each module in said initial first sequence;
      a1) all P(x,y) equal 0 if said corresponding data bits are not asserted; and otherwise
      a2) for first pixel sequences P(1) through P(X−H), where H is in the range 0 to X−1, all P(x,y), equal 1;
      a3) for first pixel sequences P(X−H+1) through P(X), all P(x,y) in second pixel sequences P(1) through P(Y−V), where V is in the range 0 to Y−1, equal 1 if a corresponding data bit for an adjacent module in a next first sequence equals 1, and otherwise equal 0; and a4) for first pixel sequences P(X−H+1) through P(X), all P(x,y) in second pixel sequences P(Y−V+1) through P(Y) equal 0 if said corresponding data bit for an adjacent module in said next first sequence equals 0, or if said corresponding data bit for a diagonally adjacent module in said next first sequence equals 0;

b) a print controller responsive to said programmable device; and c) a printhead responsive to said controller for printing an indicia including at least said 2D-barcode on a substrate; where d) said bitstream is output by the steps of:
  d1) for each module in said initial first module sequence setting all P(x,y) in said second pixel sequences P(Y−V+1) through P(Y)=0 if a data bit corresponding to a next module in said initial first sequence=0;
  d2) for each module in said initial first module sequence outputting an initial first pixel sequence;
  d3) repeating step b2 for each remaining first pixel sequence; and
  d4) repeating steps a and b for each remaining first module sequence; and where e) H and V are not both equal to 0.

11. A system as described in claim 10 where said programmable device is further programmed to carry out steps d1 through d4.

12. A system as described in claim 10 where steps d1 through d4 are carried out by said print controller.

13. A system as described in claim 10 where said programmable device comprises a digital postage meter.

14. A method for printing a 2D-barcode having I first sequences of modules MOD(i,j) and J second sequences of said modules MOD(i,j) substantially orthogonal to said first sequences, each of said modules MOD(i,j) having a one-to-one correspondence with a bit DATA(i,j) in a binary data array and comprising X first sequences of pixels P(x,y) substantially parallel to said first sequences of modules MOD(i,j) and Y second sequences of said pixels P(x,y) substantially parallel to said second sequences of modules MOD(i,j), said method comprising the steps of:

a) generating bitmaps corresponding to said first sequences of said modules MOD(i,j) and comprising binary pixel values P(x,y), by the steps of;
  a1) setting all P(x,y) equal 0, i equal 1, and j equal 1;
  a2) if data bit DATA(i,j) equal 1, for module MOD(i,j) setting pixels P(1,1) through P(X−H, 1) equal to 1, and otherwise going to step a6;
  a3) if data bit DATA(i+1,j) equal 1, for module MOD(i,j) setting pixels P(X−H+1,1) through P(X, 1) equal to 1, and otherwise going to step a4;
  a4) for module MOD(i,j), setting pixel rows P(2) through P(Y) equal to pixel row P(1);
  a5) if data bit DATA(i+1,j+1) equal 0, for module MOD(i,j) setting pixels common to pixel columns P(X−H+1,) through P(X,) and pixel rows P(Y−V+1,) through P(Y) equal to 1, and otherwise going to step a6;
  a6) if j is not equal to J setting j equal to j+1 and going to step a2), and otherwise going to step a7, whereby one of said bitmaps is generated;
  a7) outputting said generated bitmap as a bitstream;
  a8) if i is not equal to I, setting i equal to i+1 and j equal to 1 and going to step a2), and otherwise exiting, whereby a said bitmaps are sequentially generated; where b) H and V are not both equal to zero.

15. A method as described in claim 14 where said outputting step comprises the further steps of:
  a) setting j equal to 1 and x equal to 1;
  b) for module MOD(i,j) in first module sequence MOD(i,1) through MOD(i,J), if data bit DATA(i,j+1), corresponding to next module MOD(i,j+1) in said initial first sequence, equals 0, setting all P(x,y) in said second pixel sequences P(Y−V+1) through P(Y) equal to 0, and otherwise go to step c;
  c) for said module MOD(i,j)in said first module sequence MOD(i,1) through MOD(i,J),outputting a first pixel sequence P(x,1) through P(x,Y) as a bitstream;
  d) if j is not equal to J, setting j=equal to j+1 and going to step b, whereby said first pixel sequence P(x,1) through P(x,Y) is output for said next module MOD(i, j+1) is output, and otherwise going to step e;
  e) if x is not equal to X, setting x equal to x+1 and j equal to 1 and going to step b), and otherwise exiting, whereby a said first pixel sequences are sequentially output.

16. A method as described in claim 14 where said first module sequences are columns substantially transverse to a print direction.

17. A method as described in claim 16 where said bitstream is printed as successive columns of pixels substantially transverse to said print direction.

18. A method as described in claim 14 where said bitstream is printed as successive rows of pixels substantially parallel to a print direction.

19. A method as described in claim 18 where said bitstream is printed as successive rows of pixels substantially parallel to said print direction.

20. A substrate having imprinted thereon a 2D-barcode having I first sequences of modules and J second sequences of said modules substantially orthogonal to said first sequences, each of said modules having a one-to-one correspondence with a bit in a binary data array and comprising X first sequences of print elements E(x,i) substantially parallel to said first sequences of said modules and Y second sequences of said print elements E(x,i) substantially parallel to said second sequences of said modules, each of said modules comprising:

a) print elements E(x,y) which are unprinted for all x,y, if said corresponding data bits for said modules are not asserted; and otherwise b) for first print element sequences E(1) through E(X−H), where H is in the range 0 to X−1, all E(x,y) are printed;

c) for first print element sequences E(X−H+1) through E(X), all E(x,y) in second pixel sequences E(1) through E(Y−V), where V is in the range 0 to Y−1, are printed if a corresponding data bit for an adjacent module in a next first sequence equals 1, and otherwise are unprinted; and d) for first print element sequences E(X−H+1) through EP(X), all E(x,y) in second print element sequences E(Y−V+1) through E(Y) are unprinted if said corresponding data bit for an adjacent module in said next first sequence equals 0, or if said corresponding data bit for a diagonally adjacent module in said next first sequence equals 0; and e) H and V are not both equal to 0.

21. A substrate as described in claim 20 where said printed 2D-barcode comprises a postal indicium.

* * * * *